United States Patent [19]

Brandenberg

[11] Patent Number: 4,981,280
[45] Date of Patent: Jan. 1, 1991

[54] SOLENOID ACTUATED FLUID VALVE
[75] Inventor: Karl A. Brandenberg, Chehalis, Wash.
[73] Assignee: The ARO Corporation, Bryan, Ohio
[21] Appl. No.: 344,130
[22] Filed: Apr. 27, 1989
[51] Int. Cl.⁵ .............................. F16K 31/12
[52] U.S. Cl. .................. 251/26; 251/30.02; 251/45; 251/129.21
[58] Field of Search ........... 251/26, 30.02, 45, 129.02, 251/129.16, 129.21

[56] References Cited

U.S. PATENT DOCUMENTS

| | | | |
|---|---|---|---|
| 2,925,985 | 2/1960 | MacDavid | 251/30.02 |
| 2,972,465 | 2/1961 | Ray | 251/30.02 |
| 3,010,691 | 11/1961 | Canfield | 251/26 |
| 3,282,556 | 11/1966 | Hancook | 251/45 |
| 3,379,406 | 4/1968 | Greer | 251/45 |
| 3,424,427 | 1/1969 | Ruchser | 251/30.02 |
| 3,476,353 | 11/1969 | Stampfli | 251/30.02 |
| 3,593,741 | 7/1971 | Odenthal et al. | 251/26 |
| 4,477,051 | 10/1984 | Ben-Yehuda | 251/30.01 |
| 4,522,371 | 6/1985 | Fox et al. | 251/129.21 |

Primary Examiner—John Rivell
Assistant Examiner—L. R. Leo
Attorney, Agent, or Firm—Allegretti & Witcoff, Ltd.

[57] ABSTRACT

An improved solenoid actuated, fluid control valve includes a diaphragm which is fluid actuated. Inlet pressure through a restricted orifice into a chamber on one side of the diaphragm acts against the diaphragm and causes closure of the valve, when the solenoid actuated valve in the passage from the chamber to exhaust is operated. When the solenoid or pilot operated exhaust is actuated, then the chamber is depressurized and the fluid flow valve opens.

11 Claims, 3 Drawing Sheets

SOLENOID ACTUATED FLUID VALVE

BACKGROUND OF THE INVENTION

This invention relates to an improved fluid valve and, in particular, to a solenoid actuated, pneumatic valve.

Heretofore power tool designers have recognized the desirability for control of a pneumatic valve in a pneumatic tool by using electrical sensors and signals. For example, it may be desirable to sense torque output by a pneumatic screwdriver with electrical sensor means, and thereby control the air supply to the tool. Such control has been effected in various ways. One of the ways is to provide a solenoid which operates a pilot or other mechanism in order to effect pneumatic control valve actuation. In this manner a low power DC voltage solenoid can be used to actuate a pneumatic valve.

A desirable feature with respect to such a solenoid operated pneumatic valve has been to provide for a quick response time by the valve. Clapp in U.S. Pat. No. 3,822,724 discloses a fast acting solenoid operated disc valve which provides for valve response time on the order of 5 milliseconds and which also has a very small size.

The present invention contemplates a fast acting electronically operated pneumatic or fluid shut-off valve which provides for improved response time and which further provides for actuation over a wide range of pressures with a generally low voltage solenoid actuator.

SUMMARY OF THE INVENTION

Briefly, the present invention comprises an improved solenoid actuated fluid valve comprised of a valve body having a fluid valve passage therethrough from an inlet to an outlet. A valve seat is provided in that passage which cooperates with a flexible diaphragm to control fluid flow. A fluid pressure control chamber acts on the side of the diaphragm opposite the seat. The fluid pressure within that chamber is controlled by a combination of fluid pressure through a restricted orifice from the inlet into the chamber and a solenoid controlled exhaust passage from the chamber. By controlling operation of the exhaust passage with a solenoid mechanism, the pressure in the chamber against the diaphragm is thereby controlled and causes opening or closing of the fluid flow passage through the valve passage. By appropriately sizing restrictors in the various passages leading to the control chamber it is possible to provide a high degree of sensitivity and control of the switching of the fluid valve.

The solenoid actuated control mechanism which operates to control pressure within the chamber is comprised of a thin flexible magnetic plate responsive to current in a solenoid coil. The plate is flexed between a position which opens the exhaust passage from the chamber and a position which closes the exhaust passage from the chamber. The metal plate can be quickly and easily flexed to thereby control the pressure in the chamber and thus control operation of the fluid valve.

Thus, it is an object of the invention to provide an improved solenoid actuated fluid control valve.

It is a further object to provide an improved solenoid actuated fluid valve having a small number of moveable parts which provides for quick and accurate control of the passage of the fluid through the valve.

Yet another object of the invention is to provide a solenoid actuated fluid valve wherein the solenoid operates with a relatively low power to control a wide range of pressures and flow through the fluid valve.

Yet another object of the invention is to provide an improved solenoid actuated fluid valve which is useful in combination with fluid operated tools such as torque wrenches and the like. In this manner, electronic signals generated by a sensor associated with a tool can be employed to shut-off the air motor of the pneumatic tool when critical levels are reached.

Yet another object of the invention is to provide an improved solenoid actuated fluid control valve which incorporates a diaphragm actuated by a low power solenoid trigger valve.

These and other objects, advantages and features of the invention will be set forth in the detailed description which follows.

BRIEF DESCRIPTION OF THE DRAWING

In the detailed description which follows, reference will be made to the drawing comprised of the following FIGURES.

DESCRIPTION OF THE PREFERRED EMBODIMENT

Figure 1:
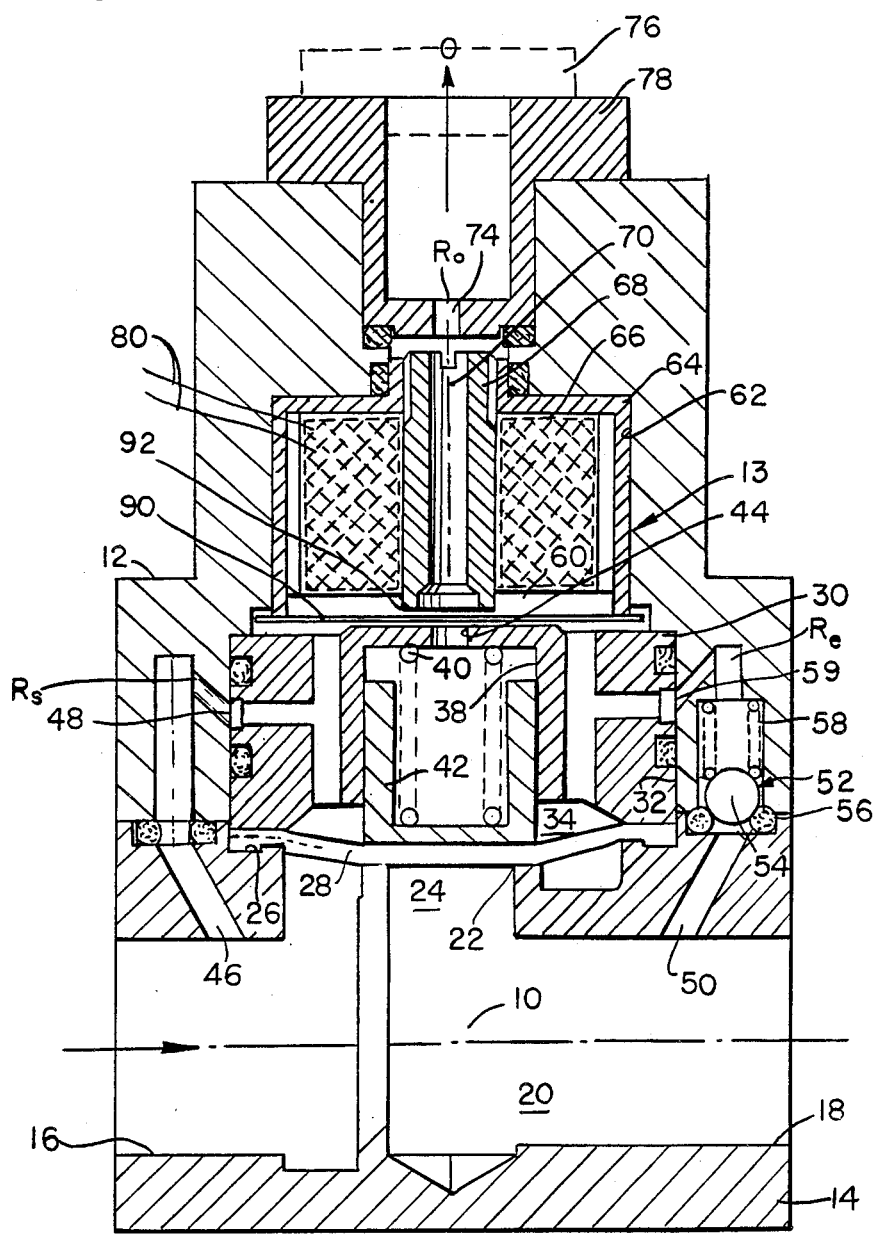
FIG. 1 is a cross-sectional view of the improved valve construction of the present invention, it being noted that the construction is generally symmetrical about a vertical axis through the valve.
Figure 2:
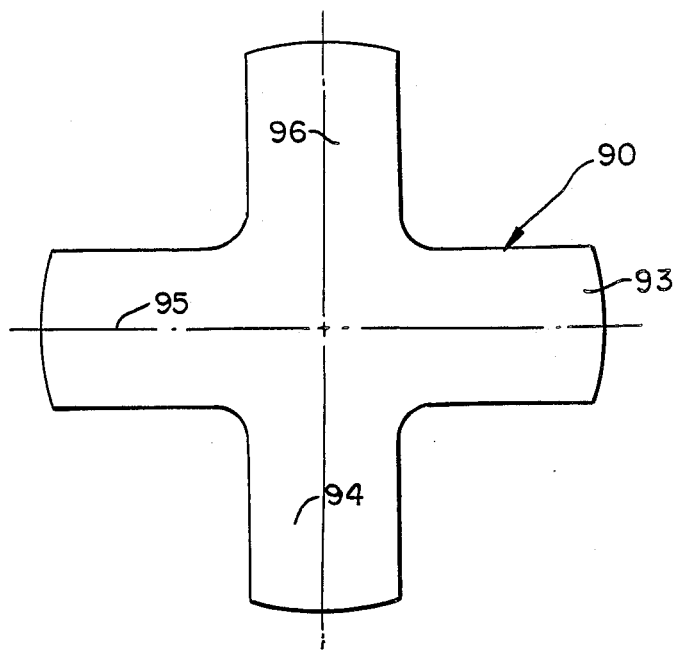
FIG. 2 is a cross-sectional view taken substantially along the line 2—2 in FIG. 1 and illustrates the configuration of the flexible magnetic, metallic valve member which is responsive to the solenoid.

Referring to the FIGURES particularly FIGS. 1 and 2, the construction of the improved solenoid actuated valve of the present invention is disclosed in detail. First it should be noted by referring to FIG. 1 that a cross-sectional view of the valve is disclosed. The valve is thus generally symmetrical about a vertical axis of revolution 10 as shown in FIG. 1, it being evident to those of ordinary skill and the art which components are not totally symmetrical and which ones will be symmetrical.

Thus, the valve is comprised of a valve housing 12 which is generally cylindrical and includes an axial, multi-diameter cylindrical bore or passage 13 therethrough. The components incorporated within the various sections of that passage 13 will be described below. Cooperative with the valve housing 12 is a valve body 14. Valve body 14 is attached by screws such as machine bolts or screws to the valve housing. The valve body 14 includes an inlet 16 and outlet 18 with a passage 20 connecting inlet 16 to the outlet 18. The passage 20 of valve body 14 includes a valve seat 22 which is defined by a cylindrical bore or passage 24 cut through the body 14. The passage 24 is concentric with the axis 10 and thus defines a circular valve seat 22. Fluid flow thus may be effected through the body 14 by entry to the inlet 16, flow through passage 20 over the seat 22 and then into the passage 24 and subsequently through the outlet 18.

The body 14 includes a recess 26 defining a counter bore for receipt of a flexible diaphragm 28. The flexible diaphragm 28 is a generally disc shaped member fabricated from an elastic material and is designed for cooperation with the seat 22 in order to seal the passage 20 between the inlet 16 and outlet 18.

The valve housing 12, which is cooperative with body 14, includes an insert core 30 which is generally cylindrical and retained within a counterbore 32. The core 30 fits to hold the diaphragm 28 tightly in position and defines various passage and chambers within the valve. The core 30 is specifically formed so that a chamber 34 is defined with respect to the diaphragm 28 on the side opposite the passage 24 and 20. The core 30 includes a concentric counterbore 38 which receives a spring 40 that biases a plunger 42 against the diaphragm 28. The plunger 42 thus slides within the counterbore 38 and provides a mechanical biasing force against diaphragm 28. Note that the core 30 includes a concentric passage 44 through the bottom of the wall of counterbore 38 to provide for equilibrium of pressure on both sides of the plunger 42. Note also counterbore 38 and plunger 42 are concentric with axis 10.

Connecting the inlet 16 or the upstream side of the passage 20 to the chamber 34 is a by pass passage 46 through the body 14 and housing 12. The passage 46 is directed through a restrictor 48 having a size $R_s$. Thus, fluid flow through the restrictor 48 is controlled by the size of the restrictor $R_s$ to the chamber 34.

The chamber 34 also connects with the downstream side of the passage 20 adjacent to inlet 18 through a second passage 50. Passage 50 connects through a check valve 52 comprising a ball 54 cooperative with a seating member 56. Ball 54 is biased by a spring 58 against the seat or seal 56. The passage 50 is connected to the chamber 34 through a restrictor 59 having a size, $R_e$. Again note that the passage 50 as well as the passage 46 both connect with the chamber 34 and also both connect through the passage 44 to the opposite side of the plunger 42 and finally both connect with an upper chamber 60 in the housing 12.

Positioned within a second reduced diameter concentric counterbore 62 in the housing 12 is an armature 64 associated with a coil 66. The coil 66 includes a fixed magnetic core 68 having a central passage 70 concentric with axis 10. The passage 70 connects from the region of the chamber 60 through an orifice 74 having a size $R_0$. The orifice 74 is connected to a control valve which controls exhaust from passage 70 through the orifice 74. A start control mechanism 76 is thus coupled with a fitting 78 to thereby control flow of fluid through the orifice 74. The fitting 78 is attached concentrically to the housing 12. Electrical control leads 80 are provided to the coil 66. Leads 80 may be connected to an electronic sensing circuit (not shown) for control by a sensor, such as a torque sensor.

A thin, flexible magnetic metal diaphragm or plate 90 is positioned within the space or chamber 60 and is juxtaposed with respect to the end of passage or the bore 70. The preferred shape of the flexible metal valve member 90 is depicted in FIG. 2. It is a cruciform shape. The center of the cruciform cooperates with a seat 92 formed at the lower end of the core passage 70. Note that the four legs 93, 94, 95, and 96 of the cruciform plate 90 are uniformly in size and shape and act to retain the plate in position within the region 60. Legs 93 through 96 center the plate 90 with respect to the passage 70. Legs 93 through 96 are uniformly spaced about the center of plate 90. The cruciform shape is particularly desirable since flexing of the cruciform shape is accomplished in a linear fashion due to the design of the shape of the cruciform plate. The plate 90 is of appropriate thickness that it permits flexing of the plate 90 when a DC current passes through the leads 80 to the coil 66 to thereby magnetize the core 68. Magnetizing the core 68 causes the plate 90 to flex and seat on the seat 92.

Valve plate member 90 typically comprises a hard chromium steel which, in a preferred embodiment, is 0.006 inches thick such as supplied by Lapham-Hickey Steel Company of Chicago, Ill. The diameter of a typical valve member 90 will be approximately 1.109 inches and each of the vanes will typically have a width dimension of 0.300 inches.

The operation of the valve is as follows. With the start control mechanism 76 not actuated, the discharge orifice 74 is sealed. The various types of start controls will be discussed in detail below. In any event, the pressure is therefore maintained in the chamber 60 as well as the chamber 34. The passage 46 provides for flow through the restrictor 48 into the chamber 34. This pressure in combination with the mechanical pressure associated with the spring 40 causes the plunger 42 to engage the diaphragm 28 and force it against the seat 22. The passage from the inlet 16 to the outlet 18 is therefore closed. Pressure at this stage of operation is also present through the orifice 59 on the back side of check valve 52. The flow of fluid through the passage 50 is therefore prevented by the valve check 52.

When the start control 76 is actuated then the orifice 74 is open to the atmosphere. This causes pressure in the chamber 60 as well as in the chamber 34 to drop. This results because the air supply through the passage 46 is restricted by the restrictor 48. The orifice 74 is thus larger or sized so as to permit a drop in pressure in the chamber 34. Since the pressure in the chamber 34 is now substantially less than the pressure in the inlet 16 the diaphragm 28 will lift from the seat 22 thereby allowing fluid to flow into the outlet through passage 24. Air also enters the passage 50 and forces the check valve 52 into the open position. Air then flows through the orifice 59 into the channels associated therewith and the chamber 34 as well as the chamber 60. This causes the pressure to rise in the chamber 34, but not to a level high enough to force the diaphragm 28 downward. The ratio of the various sizes of the orifices 48, 59 and 74 determines the pressure level within the chamber 34. Mathematically $$\frac{R_s + R_e}{R_0}$$

is the ratio which determines the pressure level. This ratio is selected to be close to the trip point of the diaphragm 28. By appropriate choice of this ratio the response time of the diaphragm 28 is reduced substantially. This results because only a small additional increase of pressure in the cavity 34 can then force the diaphragm 28 against the seat 22. The sizing of the orifices 48, 59 and 74 thus constitute a critical feature of the invention.

In order to shut-off the diaphragm valve by means of operation of the solenoid the following occurs. First a short electrical pulse is carried by the leads 80 to the solenoid coil 66. This causes the core 68 to become magnetized thereby attracting the flexible plate 90 toward the seat 92. The plate 90 closes on the seat 92 causing pressure in the passage 70 through the orifice 74 to drop to zero. Pressure in the cavity 60 which is the same as that of the chamber 34 acts on the backside of the plate 90 causing the plate to be forced against the seat 92.

The valve plate 90 remains pneumatically latched to the seat 92 even if the solenoid core 66 is no longer energized. Because air flow through the orifice 74 has now ceased, pressure in each cavity or chamber 34 and 60 increases. The pressure together with the force associated with the spring 40 forces the diaphragm 28 onto the seat 22. Air flow from the inlet 16 to the outlet 18 is then shut-off.

To reset the valve, the passage 70 must be closed and pressurized. Thus closing the passage 70 or discharge orifice 74 by some control mechanism such as the control 76 causes the pressure in the passage 70 to again rise. The plate 90 then will be released from the seat 92 to return to its original unflexed and open valve position. The valve is now ready for the next cycle of operation.

Figure 5:
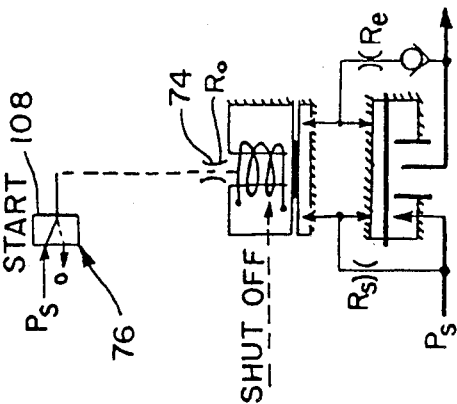
FIG. 5 is a schematic also similar to FIG. 3 wherein a pilot valve is used to comprise a control mechanism.
Figure 4:
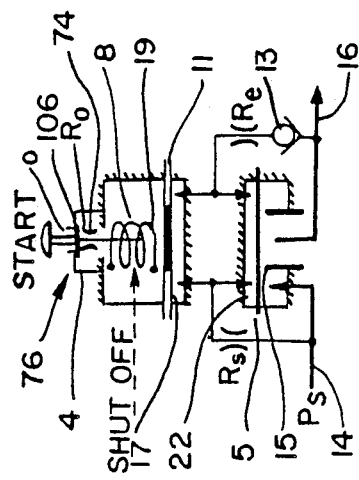
FIG. 4 is a schematic drawing similar to FIG. 3 wherein the start control attachment comprises a pilot bleed mechanism.
Figure 3:
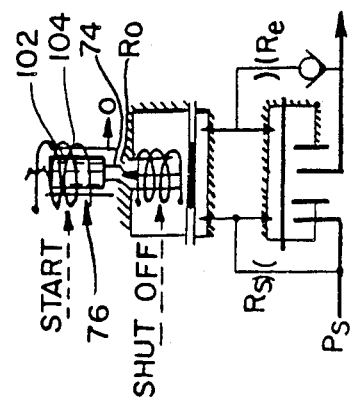
FIG. 3 is a schematic of the pneumatic circuit of the improved valve of the present invention with a solenoid actuated mechanism.

FIGS. 3, 4 and 5 disclose in a schematic fashion various types of controls for the orifice 74. In FIG. 3 a separate solenoid 102 is provided to control the escape of fluid through the passage 70 and orifice 74. Thus, a solenoid member 102 moves in response to current through a coil 104 to either open or close the passage from the restrictor 74.

In FIG. 4 a pilot bleed mechanism is used to control the operation or flow of fluid through the restrictor 74. There a manual start can be moved from a closed and seated position as depicted in the FIG. 4 to an open position where the valve 106 is unseated to achieve the control of the valve of the invention.

FIG. 5 discloses yet another construction wherein a pilot valve is used to control exhaust of fluid from the restrictor 74. The flow or passage from the restrictor 74 is either pressurized effect reset of the valve as previously described or exhausted to the atmosphere effect shut-off of the valve as previously described depending upon the position of the pilot valve 108 in FIG. 5.

The present invention differs from the referenced prior art quick acting solenoid control valve disclosed in U.S. Pat. No. 3,822,724. For example, in the '724 patent a plunger type solenoid provides for direct mechanical actuation of a disc. By contrast as disclosed, the solenoid of the present invention contemplates a separate flat valve plate to trigger pneumatic actuation. The valve plate is not directly in contact with a solenoid plunger.

In the '724 patent the solenoid plunger forces a disc off a first seat and shuts off air flow by closing a second seat. With the present invention a valve plate associated with the solenoid flexes and latches. A separate flexible diaphragm is pneumatically actuated to cutoff air flow.

In the '724 patent a powerful solenoid is required to force the valve disc from a first seat. With the present invention electronic triggering and pneumatic latching of a solenoid requires only very low power input.

The present invention thus comprises a significant improvement over the known prior art in that it relies upon a low power solenoid with a minimum number of moving parts and incorporates the benefits of a quick response time for a pneumatic valve over a broad range of pneumatic pressures.

Other start control attachments may be utilized in combination with the solenoid actuated pneumatic valve of the present invention. In any event, the construction provides for quick and easy operation. Thus, the invention is to be limited only by the following claims and their equivalents.

What is claimed is:

1. An improved solenoid actuated fluid valve comprising, in combination:

a valve body having a fluid inlet, a fluid outlet, a main fluid passage between the inlet and outlet with a main valve seat in the passage, a flexible diaphragm having a downstream side and an upstream side, said diaphragm mounted in the body for coaction with the valve seat, a portion of one side of the diaphragm in communication with the outlet when the diaphragm is seated and with both the inlet and outlet when not seated, said diaphragm being flexible at a trip point to effect seating of the diaphragm from the unseated condition;

a pressure chamber against the other side of the diaphragm;

a first restricted orifice by-pass passage connecting the inlet to the chamber acting on the other side of the diaphragm, said first restricted orifice having a size ($R_s$), a second restricted orifice by-pass passage connecting the outlet to said chamber, said second restricted orifice having a size ($R_e$), and a check valve which prevents fluid flow to the outlet from the chamber;

a fluid pressure control orifice in a control passage from the chamber operating alternatively to exhaust the chamber or pressurize the chamber thereby causing the diaphragm to flex and open the main fluid passage and to alternatively cause the diaphragm to flex and close the main fluid passage, said control orifice having a size, $R_o$, the ratio $$\frac{R_s + R_e}{R_e}$$

determining the pressure level in the chamber; and a solenoid actuated valve member in the fluid pressure control passage, said solenoid valve member normally open when the solenoid is unactuated operable to close the control passage when the solenoid is actuated thereby closing the fluid pressure control orifice and simultaneously causing the pressure in the chamber to increase and cause flexing of the diaphragm to close main fluid passage.

2. The valve of claim 1 wherein the ratio $$\frac{R_s + R_e}{R_e}$$

is maintained substantially close to the trip point of the valve flexible diaphragm.

3. The valve of claim 1 wherein the solenoid actuated valve member is a magnetically actuated plate in the control passage which is flexible in a magnetic field.

4. The valve of claim 3 wherein the plate is cruciform in shape and wherein the center of the plate comprises a valve member.

5. The valve of claim 1 wherein the control passage is concentric with the solenoid and solenoid valve member.

6. The valve of claim 2 where in the control passage, solenoid, solenoid valve member and diaphragm are concentric with each other.

7. The valve of claim 1 wherein the main valve seat is concentric with the diaphragm.

8. The valve of claim 1 wherein the solenoid actuated valve member comprises a separate solenoid control for the fluid pressure control orifice.

9. The valve of claim 1 wherein the solenoid actuated valve member comprises a separate pilot bleed control for the fluid pressure control orifice.

10. The valve of claim 1 wherein the solenoid actuated valve member comprises a separate pilot valve control for the fluid pressure control orifice.

11. The valve of claim 1 including mechanical biasing means acting against the other side of the diaphragm.

* * * * *